A. BARHORST.
FINGER BOARD FOR THRESHING MACHINES.
APPLICATION FILED APR. 21, 1915.
1,162,548.
Patented Nov. 30, 1915.
2 SHEETS—SHEET 1.
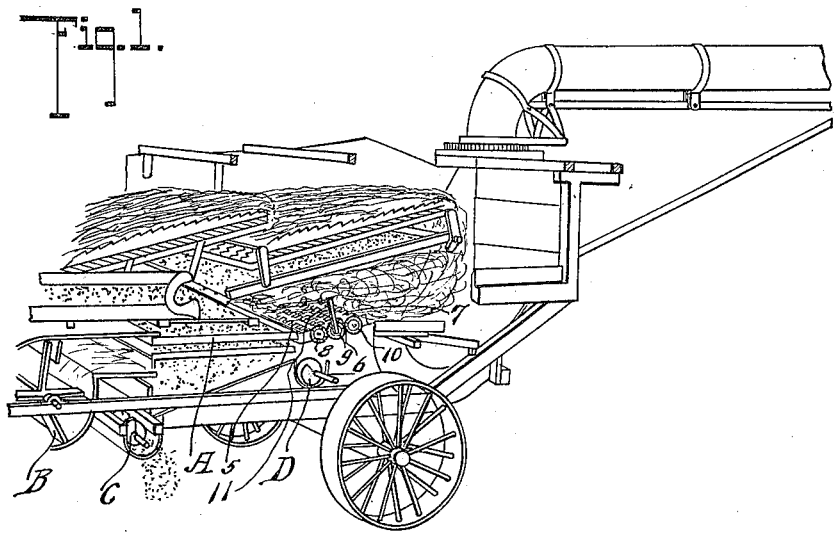
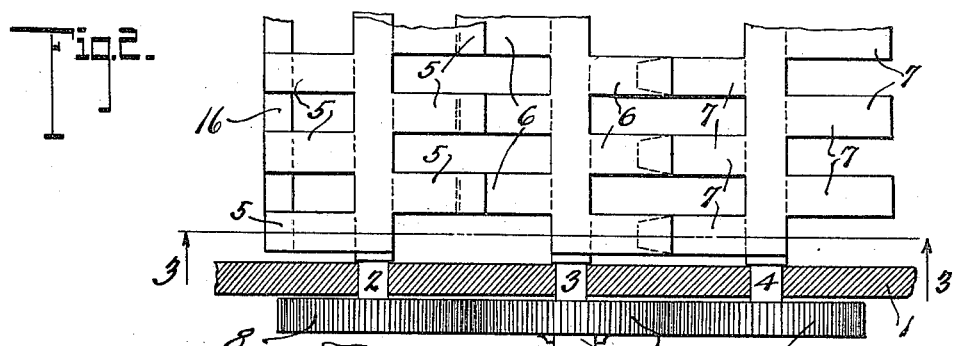
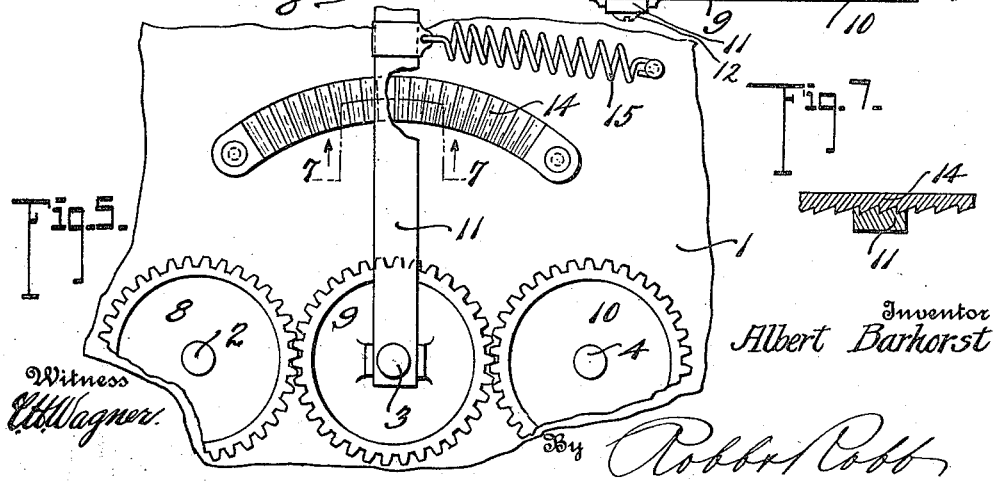
Witness
E. H. Wagner
Inventor
Albert Barhorst
By Robb & Robb
Attorneys A. BARHORST.
FINGER BOARD FOR THRESHING MACHINES.
APPLICATION FILED APR. 21, 1915.
1,162,548.
Patented Nov. 30, 1915.
2 SHEETS—SHEET 2.
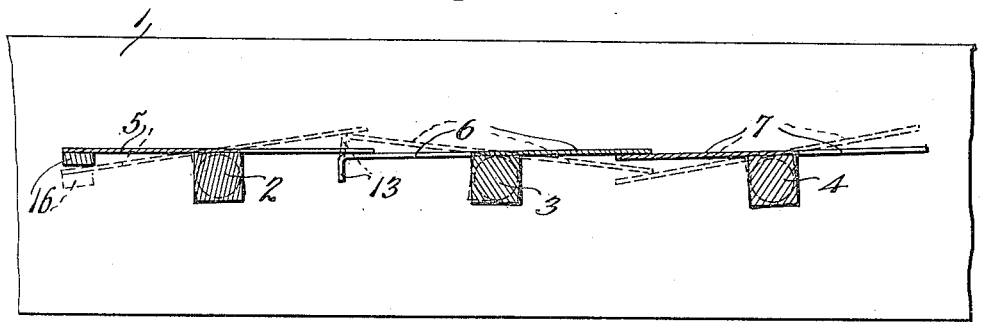
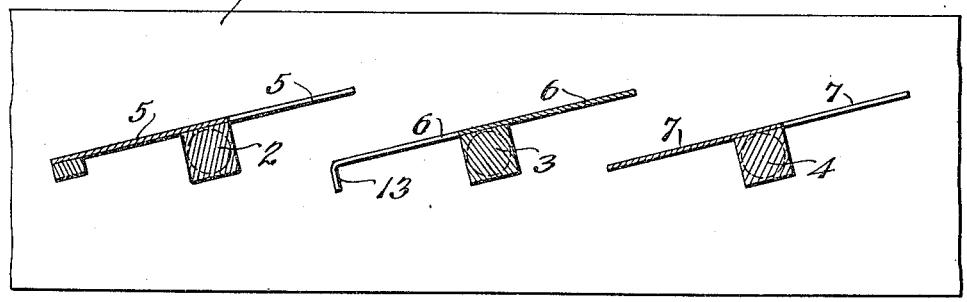
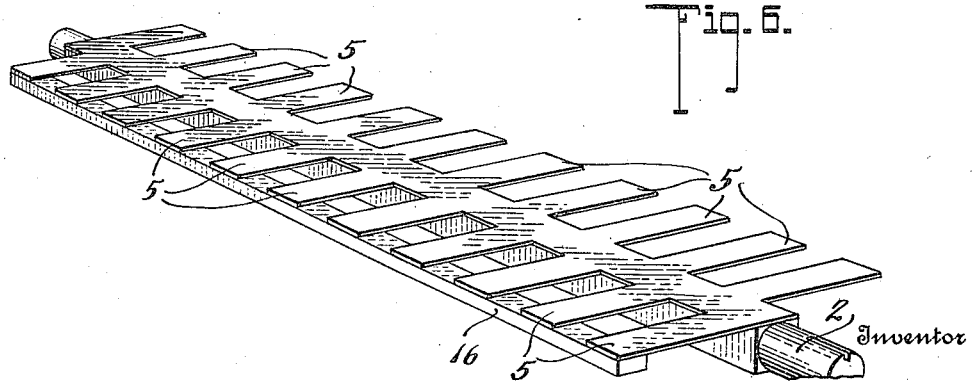
Witness
E. H. Wagner,
Inventor
Albert Barhorst
By
Robb & Robb
Attorneys

UNITED STATES PATENT OFFICE.

ALBERT BARHORST, OF McLEAN TOWNSHIP, SHELBY COUNTY, OHIO.

FINGER-BOARD FOR THRESHING-MACHINES.

1,162,548.   Specification of Letters Patent.   Patented Nov. 30, 1915.

Application filed April 21, 1915.  Serial No. 22,954.

*To all whom it may concern:*

Be it known that I, ALBERT BARHORST, a citizen of the United States, residing in McLean township, in the county of Shelby and State of Ohio, have invented certain new and useful Improvements in Finger-Boards for Threshing-Machines, of which the following is a specification.

The present invention appertains to attachments for threshing machines and comprises improvements in what are generally known as fingerboards, its characteristic being its adjustability, and, therefore, its adaptability to different conditions of grain being threshed by the machines, as well as to different operating conditions of the machine itself.

It is quite well known to threshermen that there is a vast difference between machines with respect to their ability to clean grain even in machines of the same type or construction, and with the present apparatus now in general use the proper cleaning of grain with its separation from chaff and broken straw, is rendered much more difficult when the straw is damp, for instance. Again when the straw is very dry much of said grain is blown out of the chaff by the cleaning or fanning mill, resulting in considerable loss, and this is especially true in machines equipped with blowers since the suction of the blower fan is so great that the grain in the heads between the two wind devices is driven out of the blower or stacker. The best known remedy for preventing this waste is to decrease the draft action on the grain and chaff by regulating the fan blinds but this results in delivering poorly cleaned grain, necessitating subsequent treatment to render it marketable.

Therefore, the object in view of my device is to provide a retarding means disposed adjacent to the rear end of the adjustable grain sieves, onto which means the material passes, said means being provided with adjusting means for adjusting the retarding instrumentalities according to the condition of the grain. This and such other objects as may hereinafter appear are attained by the novel construction, combination and arrangement of parts to be hereinafter specifically described and claimed.

Reference will now be had to the accompanying drawing forming a part of this specification, wherein:

Figure 1 is a fragmentary open sided perspective view of a threshing machine having my attachment arranged in proper position therein. Fig. 2 is a fragmentary plan view, partly in section showing more clearly the adjustable finger members of the device. Fig. 3 is a vertical sectional view taken about on the line 3—3 of Fig. 2. Fig. 4 is a similar view to Fig. 3 but showing a different adjustment of the retarding finger members. Fig. 5 is a fragmentary end view of the attachment showing the adjusting means more clearly. Fig. 6 is a perspective view of the first set of finger elements and showing more clearly the stop member carried thereby. Fig. 7 is a fragmentary sectional view taken on the line 7—7 of Fig. 5.

Throughout the following detail description, and on the several figures of the drawings, similar parts are referred to by like reference characters.

Referring to the drawing, Fig. 1 represents a fragmentary view of a conventional separator or thresher, A designating the usual adjustable grain sieves, B the fanning mill or blast fan, C the grain auger, and D the auger for conveying the unthreshed heads to the tailings elevator, with all of which these machines are generally equipped.

Directly in rear of the sieves A, and just above the auger D is disposed the device which constitutes my invention, an adjustable fingerboard. In its preferred embodiment it consists of a frame 1 of any desired shape or configuration, but generally rectangular, arranged at a slight incline upwardly toward the rear of the machine. Mounted transversely of the frame are a plurality of spaced rotatable shafts or supports 2, 3 and 4, each provided with a plurality of oppositely extending fingers 5, 6 and 7. The fingers at one side of these supports are staggered in relation to the fingers at the other side and the contiguous fingers of the separate supports are alined and slightly overlap each other.

It will be obvious that the foregoing described shafts may be journaled in the sides of the thresher if they are supplied as permanent equipement and the frame 1 dispensed with. In any event the shafts are provided at one end with gear members 8, 9, and 10 located exteriorly of the thresher frame so as to be accessible, said gears intermeshing, and one of the shafts is also provided with a lever or handle 11 detachably secured thereto as by means of the screw 12. This lever enables the adjustment of the finger members at different angles as shown in dotted lines in Figs. 3 and 4 and it will be understood by those skilled in the art to which the invention refers that said fingers will perform the function of baffles retarding the mixed grain and chaff or unthreshed heads when necessary, when set at a proper adjustment, as it passes from the top sieve A thereonto. The greater the angular adjustment the greater the retarding action giving increased time for the blast to act upon the grain and chaff and allowing the unthreshed heads to fall between the fingers into the tailings auger for return to the drum of the machine by way of the elevator. Now, it will be apparent that when the grain is damp and heavy, or weedy, the finger members may be adjusted by the lever 11 to lie prone or practically in horizontal plane, because under such conditions the material is sluggish in its movement under action of the blast. When, however, it is dry, it is desirable to adjust the fingers at angles as hereinbefore mentioned so that they take an upward path over the first set, then downwardly over the second, and upwardly again over the third by which time the chaff is effectively separated and ready for passing out of the machine in the usual manner. Between the second and third sets the material collects and the separating action is very effective with this arrangement since the blast causes the light chaff to whirl and the heavier particles drop down between the fingers into the auger D.

It will be observed that certain of the fingers, preferably the fingers at one side of the central set have hooked terminals 13, and the object of this construction is to prevent the grain from slipping over the fingers, giving more opportunity for the material to be pulled apart by the blast action. Obviously with this retarding action the blast may be readily increased and thereby a better cleaning of the grain is accomplished. Again, under extremely dry conditions, it is desirable to allow a certain amount of the chaff to pass back through the elevator to the drum with the grain so as to prevent cracking of said grain which is not desirable and should be prevented where possible and for this purpose I preferably remove the central gear 9 and the adjusting lever and dispose the central set of fingers at an angle as shown in Fig. 4 under which condition the three sets are in spaced parallel relation. Replacing the gear and lever upon its supporting shaft, enables adjustment at any desired angle. The chaff as mentioned above can more easily fall through into the auger with the grain.

Obviously a wide range of adjustment of this device is possible and the great advantage of the same is that this adjustment can be made without stopping the machine, and losing time, as is necessary with most arrangements now in use, the lever 11 being disposed at the side of the machine within easy reach of the threshermen. This lever is held in adjusted positions in any desired manner as by means of a toothed rack 14 secured to the side of the threshing machine. The teeth of said rack are so formed as to permit the lever 11 to slide in one direction freely but held from movement in the opposite direction by the inclination of the teeth. The lever has connected thereto a spring 15 carried by the threshing machine which holds the lever in the notches where set by the operator.

In order to prevent the strings and similar substances usually mixed with the chaff, grain and straw from becoming entangled around the sets of fingers, I provide a stop bar or slat 16 which is secured to the ends of the forward fingers 5 on the first finger bar, said slat extending transversely of the frame and catching the strings at this point.

Having thus described my invention, what I claim as new is:

1. In a device of the class described, the combination with a frame, of a plurality of transverse retarding members movably mounted therein, and means for simultaneously and differentially adjusting said members at alternate inclinations.

2. In a device of the class described, the combination with a frame, of front and rear transverse fingered bars rotatably mounted therein, an intermediate fingered bar similarly mounted, and means for adjusting the first mentioned bars at corresponding angles of inclination and the intermediate bar at an opposite inclination whereby to form a retarding trough for collection of material intermediate the bars.

3. An attachment for threshing machines comprising a plurality of adjustable finger members arranged in spaced relation, and means for adjusting said finger members at different angles with respect to each other, said means including a train of gearing, and means for rotating the finger members, one of said gear members being removable for independent adjustment of the finger members.

4. An attachment for threshing machines comprising a plurality of spaced rotatable supports, a plurality of fingers arranged at each side of said supports, means for adjusting the supports and fingers at different angles, and a stop bar carried by the fingers of the advance support.

In testimony whereof I affix my signature in presence of two witnesses.

ALBERT BARHORST.

Witnesses:
RUTH H. WENDELU,
BERNARD SHERMAN.

Copies of this patent may be obtained for five cents each, by addressing the "Commissioner of Patents, Washington, D. C."